United States Patent Office 3,332,790
Patented July 25, 1967

3,332,790
ULTRAVIOLET ABSORBING GREEN GLASS
Harvey Larry Penberthy, 5624 SW. Admiral Way,
Seattle, Wash. 98116
No Drawing. Filed Feb. 6, 1964, Ser. No. 343,110
11 Claims. (Cl. 106—52)

ABSTRACT OF THE DISCLOSURE

Disclosed is a container or bottle glass and method of making it having an appearance generally similar to emerald green glass but with better ultraviolet absorbing properties. The soda-lime-silica base glass, in addition to hexavalent chromium, also includes limited amounts of both copper oxide and cobalt oxide. The glass has sufficient near infra red transmission so that it is compatible with existing infra red inspecting devices.

This invention relates to ultraviolet absorbing glasses and more particularly to an ultraviolet absorbing green bottle glass having an appearance approximating that of conventional emerald green glass.

Certain beverages marketed for many years is emerald green glass bottles and containers were subject to deterioration. Beverages so affected included beer, wine, ale, and certain fruit and fruit flavored drinks. This deterioration is largely due to the exposure of the bottle contents to shortwave radiation in the wavelengths from about 300 to 400 millimicrons. These photochemical effects, as they are called, have led to several bottle glass compositions having ultraviolet radiation absorbing properties.

One of the most recent ultraviolet absorbing compositions is a hexavalent chromium glass described in United States Patent 2,974,052 to Bacon and Billian. This patent discloses a green bottle glass incorporating substantial amounts of chromium oxide, wherein some of the chromium oxide is in the hexavalent state. Hexavalent chromium oxide is described as imparting ultraviolet radiation absorbing properties to the green glass. However, as further pointed out in Patent 2,974,052, hexavalent chromium containing glass does not truly resemble emerald green glass because the hexavalent chromium produces a slight yellowing tendency in the glass which yellowing tendency has been found to be undesirable for many applications. In order to overcome this yellowing tendency and to restore the appearance of the glass to more nearly the conventional emerald green, the patent suggests the incorporation of a small amount of either copper oxide (CuO) or, in the alternative, a small amount of cobalt oxide (CoO).

Applicant has found that both copper oxide and cobalt oxide possess serious disadvantages when incorporated in an ultra-violet absorbing hexavalent chromium glass of the type disclosed in the aforementioned Bacon et al. patent. The present invention is directed to the fact that it has been found possible to overcome these difficulties by incorporating small amounts of both copper oxide (CuO) and cobalt oxide (CoO) in the hexavalent chromium glass of the Bacon et al. patent to provide a more satisfactory ultraviolet light absorbing glass, having more nearly the appearance and other properties of emerald green glass.

It is therefore one object of the present invention to provide a novel ultraviolet absorbing glass.

Another object of the present invention is to provide a novel emerald green type glass.

Another object of the present invention is to provide a novel green glass incorporating hexavalent chromium along with small amounts of both copper oxide and cobalt oxide.

Another object of the present invention is to provide an ultraviolet absorbing glass having an improved emerald green appearance.

These and further objects and advantages of the invention will be more apparent upon reference to the following specification and claims.

The deleterious effect of ultraviolet light on food and beverage flavors is well know. In particular, this effect has been noted with lithiated citric-flavored beverages, various other soft drinks including root beer and cola flavors, and also with beer and wine. Because of this many types of green glass have been provided for protecting bottled beverages and these may in general be divided into two classes according to the coloring agent. The older glasses used for cognac and wine were generally based on iron oxide as the green coloring agent with various amounts of manganese dioxide added to alter the visual tint. These glasses are at least partially opaque in the ultraviolet due to the presence of some ferric iron oxide. They are, however, also partially opaque in the visible spectrum and make visual inspection of the contents more difficult.

Another glass of green color is based upon chromium oxide and is generally a clearer and brighter green than those obtained with iron oxide. Two common green colors based on chromium are called emerald green and Georgia green. These glasses may or may not have small additions of iron oxide as well but the particular distinguishing characteristic due to the chromium oxide.

For many beverages conventional emerald green glass is preferred partly because of a long standing public acceptance and at least partially because the emerald green glass has sufficient transmission in the visible spectrum to permit the contents of the container to be seen.

As pointed out above, attempts have been made to rectify the ultraviolet transmitting properties of conventional emerald green glass by providing a chromium oxide glass wherein a portion of the chromium is in the hexavalent state. This is accomplished by oxidizing agents in the glass batch which drive the chromium to the hexavalent form. However, hexavalent chromium does not absorb in the orange and red regions of the spectrum with the result that the appearance of such a glass is yellow-green which is not at all acceptable to many beverage bottlers.

One solution to this yellowish color resulting from the hexavalent chromium is the incorporation of a small amount of copper oxide in the glass to absorb the yellow and produce the desirable bluish green. By the incorporation of copper oxide in the hexavalent chromium glass a very pleasing emerald green appearing glass can be obtained. Unfortunately, however, copper oxide absorbs also in the infrared range. Because of this infrared absorption, many manufacturers refuse to use a glass colored by the copper oxide. The reason for this is that many of them use an optical inspecting device that functions in the infrared region. With these inspection devices there is a specification of minimum infrared transmission through the glass which must be observed. The average reading of the transmission for glass one centimeter thick, measured at 685, 800 and 945 millimicrons, must not drop below 20 percent and certainly not below 16 percent so as not to interfere with the infrared inspecting units.

Since the copper oxide emerald green glasses will not pass the infrared inspection devices, it has also been proposed to restore the emerald green color to the hexavalent chromium glass by incorporating instead of copper oxide a small amount of cobalt oxide. When cobalt is used with chromium to make green glass the cobalt absorbs in the red and makes the glass appear the more desirable bluish green. However, unfortunately, cobalt has an absorption band corresponding with the principal transmission band of chromium with the result that the glass loses purity and looks as if the green had been mixed with black. This effect is so pronounced that many beverage companies have refused to have their products bottled in the cobalt oxide glass on the basis that it tended to make their drink less desirable, that is, tended to make the beverage look "chalky."

The objection to the cobalt oxide glass appearance results from the fact that there is a small absorption band of cobalt which practically coincides with the desirable transmission band of the chromium. The desirable range of transmission for emerald green glass is in the neighborhood of from 545 to 558 millimicrons. The absorption of cobalt in this range takes away brilliance of the green color and causes the smoky appearance. The technical way of stating this fact is that the absorption band of cobalt oxide at 545 millimicrons reduces the "purity." In the bottling industry this reduction in purity causes some of the beverages to appear chalky.

The present invention is directed to the fact that a perfectly acceptable emerald green appearing hexavalent chromium glass of the type disclosed in Patent 2,974,052 can be provided by incorporating small amounts of both copper oxide and cobalt oxide. This glass not only has the appearance of emerald green glass, but it is ultraviolet absorbing, has sufficient purity so as not to render beverages chalky, and further has sufficient infrared transmission so as to be usable with the conventional infrared inspection units. By combining both copper oxide and cobalt oxide it has been found that there is a region of acceptable glass having a rather narrow ratio of copper to cobalt which meets all the requirements described above.

A preferred batch composition and resulting glass composition, which has been found satisfactory, is given in the following table.

TABLE

Batch

| Ingredient: | Parts by wt. |
| --- | --- |
| Sand | 100 |
| Soda ash | 36.5 |
| Limestone | 28.0 |
| Feldspar | 11.8 |
| Barytes | 1.5 |
| Fluorspar | 1.4 |
| Potassium dichromate | 0.33 |
| Copper oxide (CuO) | 0.08 |
| Cobalt oxide (CoO) | 0.0016 |
| Sodium nitrate | 0.02 |
| Arsenic trioxide | 0.12 |

Glass

| Ingredient: | Percent by wt. |
| --- | --- |
| $SiO_2$ | 72.0 |
| $NaO_2$ | 14.2 |
| $CaO$ | 10.4 |
| $BaO$ | 0.7 |
| $K_2O$ | 1.0 |
| $Al_2O_3$ | 1.41 |
| $Cr_2O_3$ | 0.113 |
| $CuO$ | 0.053 |
| $CoO$ | 0.0011 |
| $As_2O_3$ | 0.080 |
| $CaF_2$ | 0.1 |

The C.I.E. colorimetric values for this glass are as follows:

| | |
| --- | --- |
| Dominant wave length _____millimicrons__ | 555.5 |
| Purity _____percent__ | 60 |
| Brightness _____do____ | 30 |
| Transmission at 400 millimicrons, 1 cm. thick _____do____ | 0.3 |
| Average infrared transmission _____do____ | 21.2 |

In general, the infrared transmission of the glass of this invention may vary from approximately 16 to 30%. For glasses of this variation, the copper oxide content is in the range of from 0.025 to 0.07% by weight. As indicated in the table, the preferred copper oxide content is sufficient to keep the infrared transmission well above the minimum requirement for most inspection machines. Likewise, for this wide variation in infrared transmission the glasses of this invention may have a cobalt-oxide value ranging from 0.0005 to 0.0016% by weight of cobalt oxide.

For actual production manufacture, most bottlers will find it sufficient to keep the average infrared transmission at the selected wave lengths very close to the nominal minimum allowable for the inspection machines, that is 20%. While 20% is given as a nominal value, the average infrared transmission at the selected wave lengths of the glass actually varies slightly from time to time in the range of from 19 to 21%. Thus, where economy is a factor, the copper oxide content for close to 20% infrared transmission is about 0.044 to 0.050% with a specific copper oxide content of 0.048% usually sufficient to maintain the nominal 20% infrared transmission.

The infrared transmission of the glass is primarily under the control of the copper oxide but is varied by variations in the iron oxide, state of oxidation of the iron oxide, and the amount of other coloring agents such as chromium oxide and the like. In actual production control, when the infrared transmission rises a little too high, the copper oxide is increased and vice versa. Because of these other factors which may vary the infrared transmission, it is not possible to state absolutely precise limits for either the copper oxide or the cobalt oxide content.

Instead, what is done is that the copper oxide is adjusted to the maximum allowable for the transmission in the infrared which has to be maintained. This is done because copper oxide is a better agent for taking away the yellowish cast than is the cobalt oxide and it is therefore desirable to use as much copper oxide as infrared transmission will permit. The upper limit on the use of the copper oxide is the minimum allowable percent of infrared transmission, i.e., 20%. When the infrared transmission drops to the minimum allowable, then the balance of the yellowish cast is taken away by the cobalt oxide which also absorbs yellow but, unfortunately, as pointed out above, also absorbs partly in the green as well.

For example, if the furnace is operated with oxidizing conditions the normal impurity and possibly added iron oxide absorb less in the infrared and the infrared transmission rises. When the furnace is operated under reducing conditions, the infrared absorption due to iron oxide will increase. The copper oxide must be increased in the first case and decreased in the second to maintain a standard transmission of 20% infrared.

Since the copper oxide is relatively fixed in amount by the infrared transmission, the cobalt oxide is varied according to the required removal of the yellow cast. The yellowish cast due to the chromium oxide varies somewhat according to the state of oxidation and reduction in the batch and the melting conditions. Thus, it is likewise not possible to name a specific content for the cobalt oxide but for a typical manufacturing composition wherein a close to the minimum 20% infrared transmission is maintained the cobalt oxide content is normally in the range of 0.0010 to 0.0012% by weight. The limit for the cobalt oxide is based upon the requirement for achieving a certain dominant wave length. The specification for emerald green glass is that it must have a dominant wave length between 554 and 558 millimicrons. However, a glass having a DWL of 556–558 is not as readily acceptable in the industry and a dominant wave length of 554–556 millimicrons is preferred.

To summarize, the emerald green glass of the present invention may possess a dominant wave length of from 554 to 558 millimicrons, a purity of from 55 to 65%, a brightness of from 27 to 35%, transmission of about 0.3% at 400 millimicrons for one centimeter thickness, and an average infrared transmission of about 20% for one centimeter thickness. These qualities are obtained by adjusting the oxidizing/reducing conditions in the batch and furnace to attain the desired transmission at 400 millimicrons, adjusting the copper oxide content until the minimum infrared transmission is approximated, adding cobalt oxide to attain the desired dominant wave length and adding sufficient chromium oxide including hexavalent chromium to attain the required purity and brightness.

As pointed out above, if the copper oxide is increased, the infrared transmission goes down below a permissible limit. If the cobalt oxide is increased, the glass becomes darker and both purity and brightness drop below the required specifications. During formation of the glass, the nitrate is adjusted according to the oxidizing/reducing conditions in the furnace to maintain the transmission of the glass at 400 millimicrons and one centimeter thick at close to zero. If the nitrate is increased excessively, light absorption in the vicinity of 400 millimicrons will be too great and absorption will extend into the blue region around, say, 440 millimicrons. The resulting glass will be both darker and more yellow. If the potassium dichromate is increased, the glass will be darker and the glass will become more yellow.

Except for the incorporation of both cobalt oxide and copper oxide in the amounts indicated above and the hexavalent chromium content as discussed below, the glass composition of the present invention and its method of formation are similar to those described in Patent 2,974,052. Most of the noncoloring and non-oxidizing ingredients are not critical and can be varied as is normal in glassmaking. The arsenic trioxide is present as a stabilizer and its concentration is not critical. The same is true for the barium sulphate.

Iron oxide higher than normally present as an impurity is not desired in the glass batch of the present invention because it decreases the purity. Other ingredients normally used in glassmaking such as magnesium oxide, boric oxide, and others may be used as desired.

It is apparent from the above that the present invention provides a novel ultraviolet absorbing emerald green type glass which has a pleasing appearance and yet permits infrared inspection of the glass contents. The novel glass is brought about by incorporation of limited amounts of both copper oxide and cobalt oxide into a hexavalent chromium type green glass. The hexavalent chromium content is in all instances sufficient to provide adequate ultraviolet absorption. The entire chromium oxide content by weight of the glass may be from 0.1 to 0.3 percent with about 0.0022 to 0.005 percent of the chromium oxide occurring as the hexavalent oxide ($CrO_3$).

In this invention, it is desirable to maintain the ultraviolet transmission at 400 millimicrons for 1 cm. thickness at about 0.3%. This provides sufficient absorption of ultraviolet light to protect the contents of the container, but does not cause an excessive absorption of blue light. When an excessive amount of blue light is absorbed, the remaining transmission of the glass is yellowish. In order to maintain the required dominant wave length, it is then necessary to add more cobalt oxide to absorb the excess yellowishness. But this has the disadvantage of making a glass which is too dark, that is, too low in brightness.

The amount of $CrO_3$ required for a transmittance about 0.3% at 400 millimicrons for 10 mm. thickness is about 0.0038% by weight. In practice, it is not easy to hold precisely on that figure, and it is normal to allow a manufacturing range of 0.005% $CrO_3$ as the maximum down to 0.0022% as a minimum. The minimum corresponds to a transmittance at 400 millimicrons for 10 mm. thickness of 3%. Within this manufacturing tolerance, the preferred range for $CrO_3$ is 0.0045–0.0030%. This corresponds to a transmittance at 400 millimicrons for 10 mm. thickness of 0.15–1.3%.

Although the invention has been described in conjunction with a glass based on calcite limestone it may also be used with one based on dolomitic limestone. This includes magnesia but has a reduced amount of calcium oxide. Glasses of this type are well known and the amounts of CaO and MgO are not critical, typical values being 8.3 percent and 5.5 percent by weight, respectively, of the glass.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An emerald green glass consisting essentially of soda-lime-silica glass containing by weight about 0.10% to 0.30% total chromium oxides expressed as $Cr_2O_3$ and present as both trivalent ($Cr_2O_3$) and hexavalent ($CrO_3$) chromium oxide, the hexavalent chromium oxide ranging from about 0.0022% to 0.005%, 0.025% to 0.070% copper oxide (CuO), and 0.0005% to 0.0016% cobalt oxide.

2. An emerald green glass consisting essentially of soda-lime-silica glass containing by weight about 0.10% to 0.30% total chromium oxides expressed as $Cr_2O_3$ and present as both trivalent ($Cr_2O_3$) and hexavalent ($CrO_3$) chromium oxide, the hexavalent chromium oxide ranging from about 0.0022% to 0.005%, 0.025% to 0.070% copper oxide (CuO), and 0.0005% to 0.0016% cobalt oxide, and less than 0.3% $Fe_2O_3$, said glass having an average infrared transmission of from 16% to 30%.

3. An emerald green glass consisting essentially of soda-lime-silica glass containing by weight about 0.10% to 0.30% total chromium oxide expressed as $Cr_2O_3$ and present as both trivalent ($Cr_2O_3$) and hexavalent ($CrO_3$) chromium oxide, the hexavalent chromium oxide ranging from about 0.0030% to 0.0045%, 0.044% to 0.050% copper oxide (CuO), and 0.0010% to 0.0012% cobalt oxide (CoO).

4. A glass according to claim 3 wherein said copper oxide is about 0.048% and said cobalt oxide is about 0.0011%.

5. An emerald green glass consisting essentially of soda-lime-silica glass containing by weight about 0.10% to 0.30% total chromium oxides expressed as $Cr_2O_3$ and present as both trivalent ($Cr_2O_3$) and hexavalent ($CrO_3$) chromium oxide, the hexavalent chromium oxide ranging from about 0.0030% to 0.0045%, 0.044% to 0.050% copper oxide (CuO), and 0.0010% to 0.0012% cobalt oxide (CoO), said glass having a dominant wave length of 554–558 millimicrons, a purity of 55%–65%, a brightness of 27%–35%, transmission about 0.3% at 400 millimicrons for one centimeter thickness and an average infrared transmission of about 20% for one centimeter thickness.

6. An ultraviolet radiation absorbing green glass consisting essentially of soda-lime-silica glass containing by weight at least 0.1% $Al_2O_3$, less than 0.3% $Fe_2O_3$, about 0.10% to 0.30% total chromium oxides expressed as $Cr_2O_3$ and present as both trivalent ($Cr_2O_3$) and hexavalent ($CrO_3$) chromium oxide, the hexavalent chromium oxide ranging from about 0.0030% to 0.0045%, 0.044% to 0.050% copper oxide (CuO), and 0.0010% to 0.0012% cobalt oxide (CoO), said glass having a dominant wave length of 554–558 millimicrons, a purity of 55%–65%, a brightness of 27%–35%, transmission about 0.3% at 400 millimicrons for one centimeter thickness and an average infrared transmission of about 20% for one centimeter thickness.

7. A glass according to claim 6 wherein said dominant wave length is 554 to 556 millimicrons.

8. A glass according to claim 6 wherein said copper oxide is about 0.048% and said hexavalent chromium is about 0.0038%.

9. An emerald green glass consisting essentially of the following ingredients:

| Ingredients— | Percent by wt. |
| --- | --- |
| $SiO_2$ | 60–75 |
| $Al_2O_3$ | at least 0.1 |
| $Fe_2O_3$ | <0.3 |
| $Cr_2O_3$ (total) | 0.10–0.30 |
| $CrO_3$ | 0.0022–0.005 |
| $CuO$ | 0.025–0.070 |
| $CoO$ | 0.0005–0.0016 |

10. An emerald green glass consisting essentially of the following ingredients:

| Ingredients— | Percent by wt. |
| --- | --- |
| $SiO_2$ | 60–75 |
| $Al_2O_3$ | at least 0.1 |
| $Fe_2O_3$ | <0.3 |
| $Cr_2O_3$ (total) | 0.10–0.30 |
| $CrO_3$ | 0.0030–0.0045 |
| $CuO$ | 0.044–0.050 |
| $CoO$ | 0.0010–0.0012 |

11. An emerald green glass consisting essentially of the following ingredients:

| Ingredients— | Percent by wt. |
| --- | --- |
| $SiO_2$ | 72.0 |
| $NaO_2$ | 14.2 |
| $CaO$ | 10.4 |
| $BaO$ | 0.7 |
| $K_2O$ | 1.0 |
| $Al_2O_3$ | 1.41 |
| $Cr_2O_3$ | 0.113 |
| $CuO$ | 0.053 |
| $CoO$ | 0.0011 |
| $As_2O_3$ | 0.080 |
| $CaF_2$ | 0.1 |

References Cited
UNITED STATES PATENTS

| | | | |
| --- | --- | --- | --- |
| Re. 25,456 | 10/1963 | Bacon et al. | 106—54 |
| 2,923,636 | 2/1960 | Swain | 106—52 |
| 3,203,816 | 8/1965 | Bull et al. | 106—52 |

HELEN M. McCARTHY, *Primary Examiner.*